Figure 1:
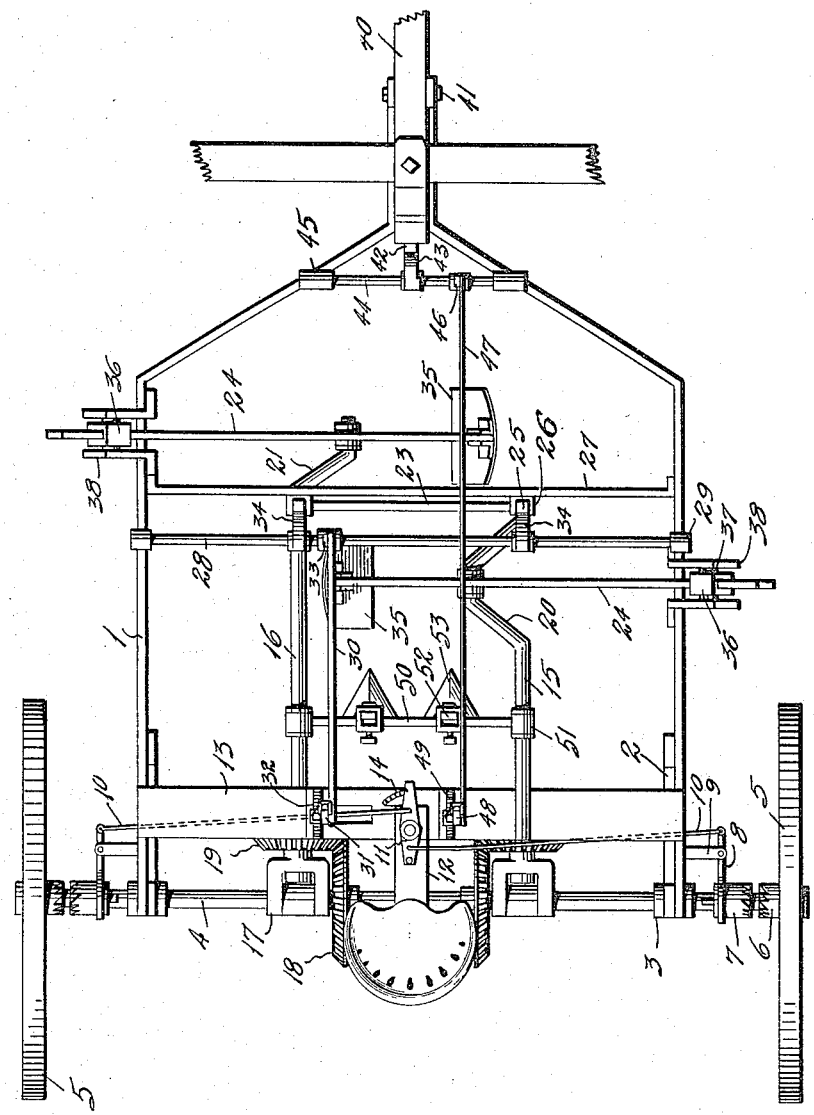

H. STRONG.
COTTON CHOPPER.
APPLICATION FILED JUNE 10, 1915.

1,164,029.

Patented Dec. 14, 1915.
2 SHEETS—SHEET 1.

INVENTOR
HAROLD STRONG
BY
Jack A. Ashley
ATTORNEY

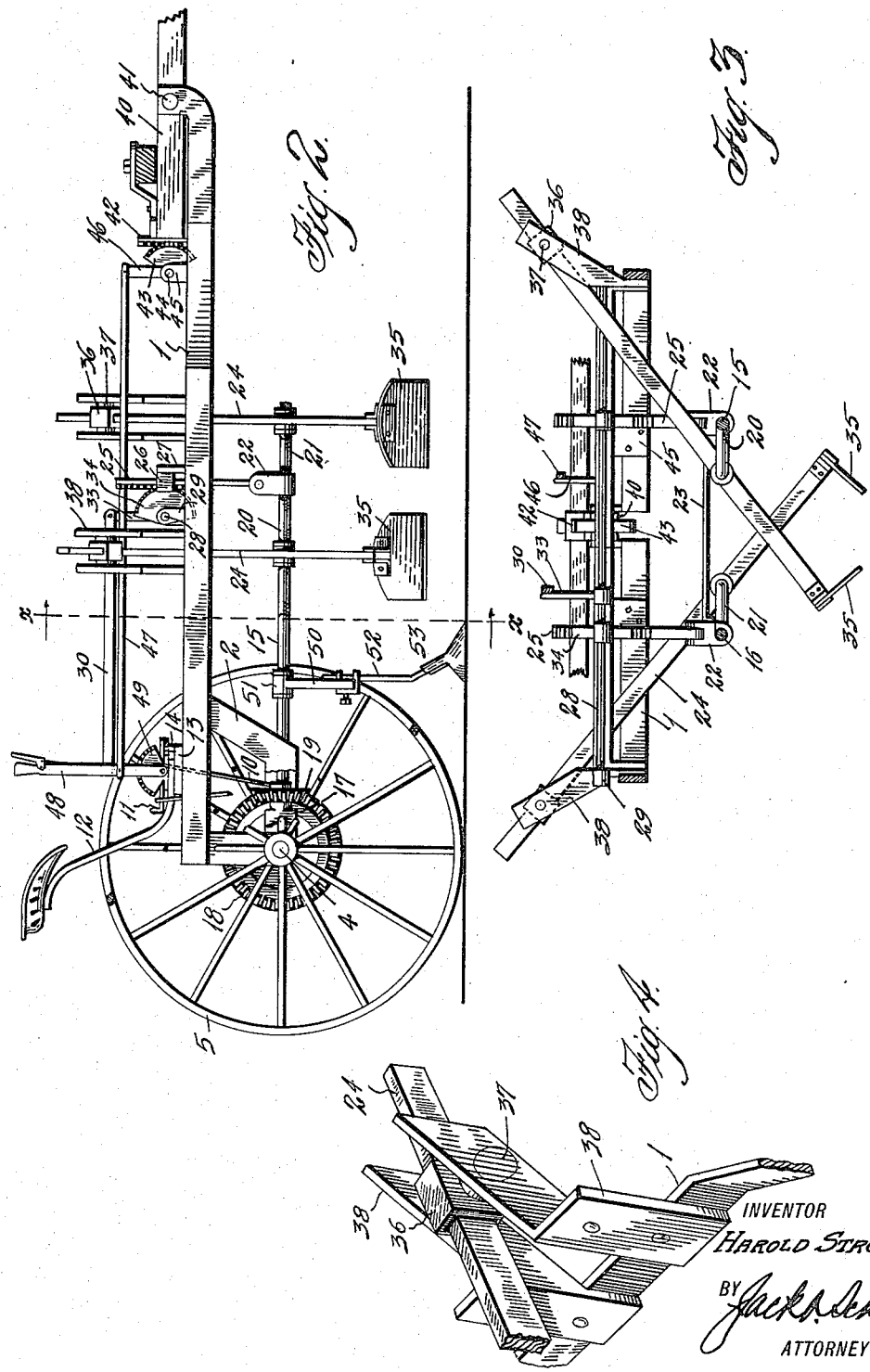

UNITED STATES PATENT OFFICE.

HAROLD STRONG, OF ROTAN, TEXAS.

COTTON-CHOPPER.

1,164,029.   Specification of Letters Patent.   Patented Dec. 14, 1915.

Application filed June 10, 1915. Serial No. 33,226.

*To all whom it may concern:*

Be it known that I, HAROLD STRONG, citizen of the United States, residing at Rotan, in the county of Fisher and State of Texas, have invented certain new and useful Improvements in Cotton-Choppers, of which the following is a specification.

This invention pertains to improvements in cotton choppers.

The object of the invention is to provide a machine having a pair of oscillating hoes swinging in opposed relation and supported in vertically adjustable bearings suspended from a main frame, in combination with other novel features hereinafter set forth.

Another object is to provide an apparatus of the character described that will be strong, durable, efficient, and simple and comparatively inexpensive to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a plan view of the cotton chopper, Fig. 2 is a side elevation of the same, Fig. 3 is a transverse vertical sectional view taken on the line X—X of Fig. 2, and Fig. 4 is a perspective view of one of the hoe guides.

In the drawings the numeral 1 designates a frame of suitable construction and having depending standards 2 carrying axle boxes 3 receiving an axle 4 whereby the frame is supported. The axle revolves in the boxes 3 and is supported at its ends by ground wheels 5, loosely confined thereon. Each wheel has a clutch hub 6 constructed to be engaged by a clutch collar 7 splined on the axle and slidable by means of a lever 8 pivoted on an arm 9 extending from the standard. From the forward end of each lever 8 a rod 10 extends through the adjacent standard and is bent up and shaped so as to pivotally engage a foot lever 11 on opposite sides of its pivot point. The foot lever is pivoted on the lower portion of the seat spring 12 which is fastened on a cross plate 13 mounted on the frame 1. The forward end of the foot lever engages a toothed segment 14 fastened on the plate whereby said lever is retained in the position to which it is swung. The driver by swinging the foot lever throws the clutch collars 7 into the hubs 6, thus causing the wheels 5 to revolve the axle.

A pair of crank-shafts 15 and 16 extend longitudinally of the frame. Each crank shaft has its rear end loosely confined in a yoke 17 mounted on the axle 4. Each shaft is driven by a bevel gear 18 fixed on the axle and meshing with a bevel pinion 19 fixed on the shaft, the gears being set so as to revolve the shafts in opposite directions. The shaft 15 has a full crank 20 at its forward end; while the shaft 16 projects forward of the crank 20 and terminates in a half-crank 21. The offset or "throw" of the crank and half-crank is substantially the same.

Suspended bearing boxes 22 support the forward ends of the crank-shafts, one receiving the extremity of the full-crank 20 and the other receiving the crank-shaft 16 adjacent the half-crank. These boxes are alined transversely of the machine and tied together by a cross rod 23. The parts 20 and 21 are on opposite sides of the boxes 22 as is shown in Figs. 1 and 2. The cranks 20 and 21 have pivotal connection with hoe shanks 24 constructed and arranged in a manner hereinafter described.

The bearing boxes 22 are pivotally carried on the lower ends of rack bars 25 disposed vertically in guides 26 mounted on a transverse supporting member 27 having its ends secured to the frame 1. A rock shaft 28 is disposed transversely of the frame in supports 29 at each end and has fixed thereon a pair of toothed segments 34 engaging the rack bars 25. By rocking said shaft the bars 25 are adjusted vertically whereby the crank-shafts have their forward ends swung up or down and the depth of the cut of the hoes regulated. The shaft 28 is rocked by means of an arm 33 secured thereto and pivotally connected with an operating lever 31 by a link 30. The lever 31 is pivoted to a toothed segment 32 fixed on the plate 13 and has provision for engaging the segment whereby it is held in its adjusted position.

The hoe shanks 24 carry hoes 35 on their lower ends and each shank has its upper portion sliding through a guide block 36 provided with trunnions 37 supported in a pair of brackets 38 secured to the frame 1. The blocks are pivoted and the brackets are disposed on opposite sides of the frame. When the crank-shafts are rotated the cranks 20 and 21 are revolved whereby the hoe shanks are oscillated, the hoes 35 striking through the row from opposite sides.

For adjusting the relative angles of the frame 1 and the tongue 40 which is pivoted thereto at 41, a vertical rack bar 42 is secured to the rear end of the tongue and is engaged by a toothed segment 43 fixed on a rock shaft 44. The shaft 44 is mounted in bearing brackets 45 secured to the frame and is rocked by an arm 46 fixed thereon. For adjusting the parts from the driver's seat a lever 48 is connected with the arm 46 by a link 47 and is pivoted to toothed segment 49 fixed on the plate 13. The lever has provision for locking it in its adjusted position on the segment.

A hanger 50 is suspended from collars 51 loosely confined on the crank-shafts and has clamped thereon standards 52 carrying cultivator shovels 53, positioned as is best shown in Fig. 1. These shovels travel on opposite sides of the center of the row and follow the hoes so as cover up the remaining plants and fill the gaps cut by the hoes.

The invention is presented as including all such modifications and changes as properly come within the scope of the appended claims.

What I claim, is:

1. In a cotton chopper, the combination with an axle, ground wheels adapted to revolve the axle, and a frame mounted on the axle; of a pair of crank-shafts having their rear ends pivoted to the axle; a driving connection between each shaft and the axle; cranks at the forward ends of the shafts; hoe shanks pivoted on the cranks and extending above the frame; bearing boxes receiving the shafts adjacent the cranks; a rigid connection extending between the boxes and maintaining them at a fixed distance from each other; vertically adjustable elements suspended from the frame and supporting the boxes; means mounted on the frame for adjusting the box supporting elements; hoes fixed on the lower ends of the shanks; and guides mounted on opposite sides of the frame, each including a pivoted member slidably receiving one of the hoe shanks.

2. In a cotton chopper; the combination with an axle, ground wheels adapted to revolve the axle, and a frame mounted on the axle; of a pair of crank-shafts having their rear ends pivoted to the axle; a driving connection between each shaft and the axle; cranks at the forward ends of the shafts; bearing boxes from which the cranks extend in opposite directions; hoe shanks pivoted on the cranks; rack bars having their lower ends pivoted to the bearing boxes; a bar connecting the boxes rigidly; a fixed guide mounted on the frame and receiving the upper portions of the rack bars; a rock shaft mounted on the frame; segments fixed on the rock shaft and meshing with the rack bars; a lever mechanism mounted on the frame and having connection with the rock shaft for rocking the same; hoes fixed on the lower ends of the hoe shanks; and guides mounted on opposite sides of the frame and including pivoted blocks slidably receiving the upper end portions of the hoe shanks.

HAROLD STRONG.

Copies of this patent may be obtained for five cents each, by addressing the "Commissioner of Patents, Washington, D. C."